US 9,503,915 B2

United States Patent
Dharanipragada et al.

(10) Patent No.: US 9,503,915 B2
(45) Date of Patent: Nov. 22, 2016

(54) DYNAMIC BEAMFORMING CONFIGURATION BASED ON NETWORK CONDITIONS

(71) Applicant: Aruba Networks, Inc., Sunnyvale, CA (US)

(72) Inventors: Kalyan Dharanipragada, Fremont, CA (US); Gautam D. Bhanage, Sunnyvale, CA (US); Venkatesh Kannan, Sunnyvale, CA (US); Sachin Ganu, San Jose, CA (US); Scott McGrath, Boscawen, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 128 days.

(21) Appl. No.: 13/857,314

(22) Filed: Apr. 5, 2013

(65) Prior Publication Data
US 2014/0269370 A1    Sep. 18, 2014

Related U.S. Application Data (60) Provisional application No. 61/793,179, filed on Mar. 15, 2013.

(51) Int. Cl.
| | | |
|---|---|---|
| *H04W 24/02* | (2009.01) | |
| *H04W 72/04* | (2009.01) | |
| *H04L 12/801* | (2013.01) | |
| *H04L 12/54* | (2013.01) | |
| *H04B 7/06* | (2006.01) | |

(Continued)

(52) U.S. Cl.
CPC ............. *H04W 24/02* (2013.01); *H04B 7/061* (2013.01); *H04L 47/10* (2013.01); *H04W 72/0486* (2013.01); *H04B 7/0608* (2013.01); *H04B 7/0619* (2013.01); *H04B 7/0626* (2013.01); *H04B 7/0632* (2013.01); *H04L 12/5695* (2013.01); *H04L 47/11* (2013.01); *H04L 47/15* (2013.01); *H04W 28/0289* (2013.01);

(Continued)

(58) Field of Classification Search
CPC ............... H04B 7/0617; H04B 7/0408; H04B 7/061; H04B 7/0619; H04B 7/088; H04B 7/063; H04B 7/0632; H04B 7/086; H04B 7/0639; H04W 16/28; H04W 36/0083; H04W 48/16; H04W 52/0206; H04W 72/02; H04W 72/082; H04W 72/0453; H04W 72/046; H04W 72/0486; H04W 28/16; H04W 28/20; H04W 28/0289; H04W 24/02; H04W 84/12; H04L 41/0896; H04L 45/125
USPC ............... 370/252, 338, 328, 329, 392, 310, 370/310.2, 332, 334
See application file for complete search history.

(56) References Cited

U.S. PATENT DOCUMENTS

| | | | |
|---|---|---|---|
| 8,150,399 B2 * | 4/2012 | Wong et al. | 455/443 |
| 8,345,732 B2 * | 1/2013 | Fischer et al. | 375/219 |

(Continued)

*Primary Examiner* — Kwang B Yao
*Assistant Examiner* — Ricardo Castaneyra
(74) *Attorney, Agent, or Firm* — Brooks, Cameron & Huebsch, PLLC (57) ABSTRACT

A method includes steering client devices to access points that potentially increase capacity of communications using beamformed transmissions. In particular, this includes determining the best access points for beamforming to a particular client or a group of clients in the network for an improved throughput performance in the deployment or a subset of access points.

21 Claims, 3 Drawing Sheets

(51) Int. Cl.
*H04W 72/08* (2009.01)
*H04W 84/12* (2009.01)
*H04W 28/02* (2009.01)

(52) U.S. Cl.
CPC ....... *H04W 72/046* (2013.01); *H04W 72/0453* (2013.01); *H04W 72/085* (2013.01); *H04W 84/12* (2013.01)

(56) References Cited

U.S. PATENT DOCUMENTS

| | | | |
|---|---|---|---|
| 8,509,071 | B1 | 8/2013 | Narayanaswamy |
| 8,787,841 | B2 * | 7/2014 | Ketchum et al. ............... 455/69 |
| 2003/0087629 | A1 * | 5/2003 | Juitt et al. .................... 455/411 |
| 2006/0020700 | A1 | 1/2006 | Qiu et al. |
| 2006/0233131 | A1 * | 10/2006 | Gore et al. ................... 370/328 |
| 2008/0080553 | A1 * | 4/2008 | Hasty et al. .................. 370/468 |
| 2009/0290518 | A1 * | 11/2009 | Gossain et al. ............... 370/310 |
| 2010/0085884 | A1 * | 4/2010 | Srinivasan et al. .......... 370/252 |
| 2010/0202548 | A1 * | 8/2010 | Sanayei ....................... 375/260 |
| 2011/0158190 | A1 * | 6/2011 | Kuwahara et al. ........... 370/329 |
| 2011/0188393 | A1 * | 8/2011 | Mallik et al. ................. 370/252 |
| 2012/0039265 | A1 * | 2/2012 | Patel et al. ................... 370/329 |
| 2012/0170471 | A1 * | 7/2012 | Brown et al. ................ 370/252 |
| 2013/0097309 | A1 | 4/2013 | Ma et al. |
| 2013/0136016 | A1 * | 5/2013 | Lee ...................... H04W 84/12 370/252 |
| 2013/0176979 | A1 * | 7/2013 | Ohwatari et al. ............ 370/329 |
| 2013/0229307 | A1 * | 9/2013 | Chang et al. ................ 342/372 |
| 2014/0025796 | A1 | 1/2014 | Vibhor et al. |
| 2014/0059265 | A1 | 2/2014 | Iyer et al. |
| 2014/0094164 | A1 * | 4/2014 | Hwang et al. ................ 455/423 |
| 2014/0269280 | A1 | 9/2014 | Bhanage et al. |

\* cited by examiner

DYNAMIC BEAMFORMING CONFIGURATION BASED ON NETWORK CONDITIONS

CROSS REFERENCE TO RELATED APPLICATIONS

This application claims priority under 35 U.S.C. §119 from U.S. Provisional Application No. 61/793,179, entitled "Dynamic Access Point Configuration Based on Network Conditions," filed on Mar. 15, 2013, the entirety of which is incorporated herein by reference. This application is related to co-pending U.S. patent application Ser. No. 13/857,321, entitled "Channel Width Configuration Based on Network Conditions," filed on Apr. 5, 2013, the entirety of which is incorporated herein by reference.

TECHNICAL FIELD

The present disclosure relates to configuring access points based on network conditions in a wireless network. In particular, the present disclosure relates to steering client devices to access points that potentially increase capacity of communications using beamformed transmissions.

BACKGROUND

Over the past decade, there has been a substantial increase in the use and deployment of wireless network devices, from dual-mode smartphones to tablets capable of operating in accordance with a particular Institute of Electrical and Electronics Engineers (IEEE) standard. With "wireless" becoming the de-facto medium for connectivity among users, it has become increasingly important for access points to intelligently manage connections with a plurality of client devices to maintain high throughput and avoid overprovisioning.

Currently, several variants of IEEE 802.11 support multiple channel widths and optional beamforming capabilities. Network administrators are often forced to painstakingly individually adjust these parameters to increase network performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "FDA", a wireless receiver and/or transmitter, an access point, a base station, a communication management device, a router, a switch, and/or a controller.

One type of digital device, referred to as an "access point," is a combination of hardware, software, and/or firmware that is configured to control at least (1) channel widths between access points and client devices and (2) beamforming characteristics between access points and client devices.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Architectural Overview

Figure 1:
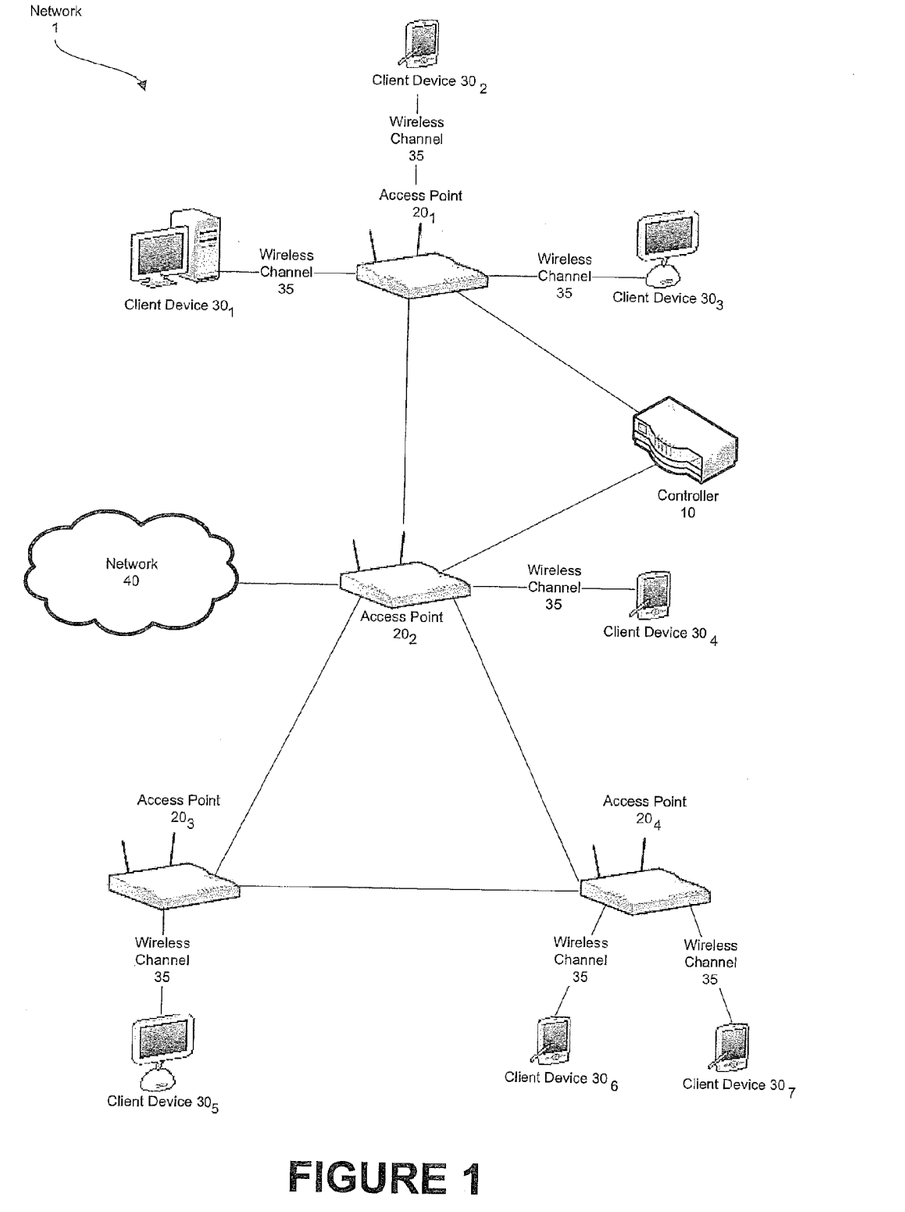
FIG. 1 shows a block diagram example of a network in accordance with one or more embodiments.

FIG. 1 shows a block diagram example of a network 1 in accordance with one or more embodiments. Network 1, as illustrated in FIG. 1, is a digital system that may include a plurality of digital devices such as controller 10, access points $20_1$-$20_4$ and one or more client devices $30_1$-$30_7$. The client devices 30 may include any set of devices that communicate wirelessly with access points 20 within network 1. In one or more embodiments, network 1 may include more or less devices than the devices illustrated in FIG. 1, which may be connected to other devices within network 1 via wired and/or wireless mediums.

In one embodiment, client devices 30 are digital devices that include a hardware processor, memory hierarchy, and input/output (I/O) interfaces including a wireless interface such as an IEEE 802.11 wireless interface. The wireless interface may be used to communicate with access points 20 and/or controller 10. Client devices 30 may include one or more antennas for establishing one or more concurrent spatial data streams with an access point 20. Client devices 30 may be wireless electronic devices capable of receiving video, voice, and/or other data streams. Such wireless electronic devices may include, but are not limited to, personal computers, laptop computers, netbook computers, wireless music players, portable telephone communication devices, smart phones, tablets, digital televisions, etc.

Access points $20_1$-$20_4$ may be any devices that can associate with client devices 30 to transmit and receive data over wireless channels 35. In one embodiment, access points 20 may correspond to a network device such as a wired access port, a wireless access port, a switch, a router, or any combination thereof. For example, access point $20_1$ may be a router or any device that may be configured as a hotspot (e.g., a cell phone, a tablet, a laptop, etc.). Access points 20 may be communicatively coupled to other networks, such as external network 40, via a transmission medium to send and receive data. The data may include, for example, video data and/or voice data. The transmission medium may be a wired or a wireless connection. Access points 20 communicatively couple client devices 30 to other client devices 30 or other networks (e.g., external network 40) by forwarding data to or from client devices 30.

Figure 2:
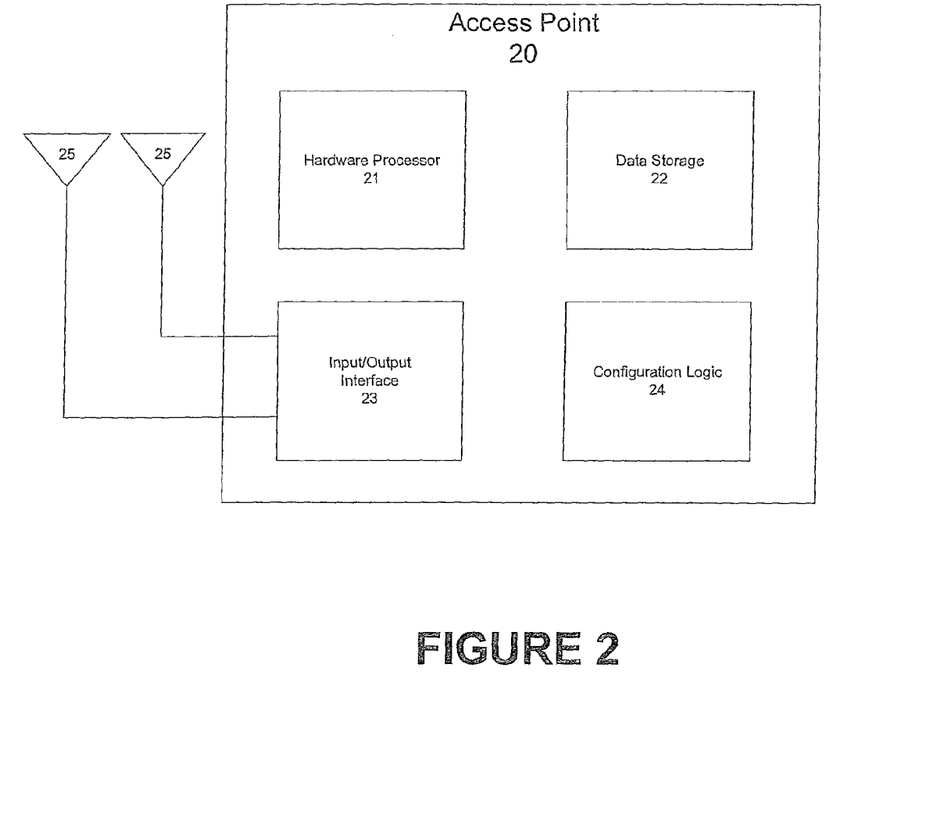
FIG. 2 shows a block diagram example of an access point in accordance with one or more embodiments.

FIG. 2 shows a block diagram example of an access point 20 in accordance with one or more embodiments. In response to instructions from a network device, e.g., controller 10 or some logic on access points 20 such as a virtual controller, each access point 20 may be a combination of hardware, software, and/or firmware that is configured to configure at least (1) channel widths between associated client devices 30, and (2) beamforming characteristics for transmission to client devices 30. Although illustrated as being configured by the controller 10, in some embodiments the access points 20 may be configured by logic on the access points 20 themselves. For example, a virtual controller on one or more access points 20 may perform configuration operations as described herein. In one embodiment as shown in FIG. 2, an access point 20 may be a network device that comprises one or more of: a hardware processor 21, data storage 22, an I/O interface 23, and device configuration logic 24. Other access points 20 within system 1 may be configured similarly or differently than the access point 20 shown in FIG. 2.

Data storage 22 of access point 20 may include a fast read-write memory for storing programs and data during access point 20's operations and a hierarchy of persistent memory, such as Read Only Memory (ROM), Erasable Programmable Read Only Memory (EPROM,) and/or Flash memory for example, for storing instructions and data needed for the startup and/or operations of access point 20. Data storage 22 stores data that is to be transmitted from access point 20 or data that is received by access point 20. In an embodiment, data storage 22 is a distributed set of data storage components.

In an embodiment, I/O interface 23 corresponds to one or more components used for communicating with other devices (e.g., client devices 30) via wired or wireless signals. I/O interface 23 may include a wired network interface such as an IEEE 802.3 Ethernet interface and/or a wireless interface such as an IEEE 802.11 WLAN interface. I/O interface 23 may communicate with client devices 30 over corresponding wireless channels 35. Wireless channels 35 may be of various widths, which may be dynamically changed during operation. For example, each wireless channel 35 may be dynamically configured to operate at 20 MHz, 40 MHz, 80 MHz, or 160 MHz. I/O interface 23 may include one or more antennas 25 for communicating with client devices 30, controller 10, and other wireless devices in network 1. For example, multiple antennas 25 may be used for forming transmission beams to client devices 30 through adjustment of gain and phase values for corresponding antenna 25 transmissions. The generated beams may avoid objects and create an unobstructed path to client devices 30 to possibly increase transmission capacity.

Hardware processor 21 is coupled to data storage 22 and I/O interface 23. Hardware processor 21 may be any processing device including, but not limited to a MIPS/ARM-class processor, a microprocessor, a digital signal processor, an application specific integrated circuit, a microcontroller, a state machine, or any type of programmable logic array.

In an embodiment, device configuration logic 24 includes one or more functional units implemented using firmware, hardware, software, or a combination thereof for configuring parameters associated with access point 20 and client devices 30. Although, device configuration logic 24 is shown as implemented on access point 20, one or more physical or functional components of device configuration logic 24 may be implemented on separate devices. The device configuration logic 24 may be configured to adjust (1) channel widths between access points 20 and client devices 30, and/or (2) beamforming characteristics between access points 20 and clients 30 as will be described in further detail below.

Controller 10 may be any device that can manage and configure access points 20 and/or client devices 30 operating in network 1. For example, as described in further detail below, controller 10 may configure one or more access points 20 to (1) adjust channel widths between an access point 20 and client devices 30 and/or (2) steer a client device 30 to an access point 20 that may provide increased capacity through the use of transmission beamforming. In one embodiment, controller 10 may correspond to a network device such as a wired access port, a wireless access port, a switch, a router, an access point, or any combination thereof. For example, controller 10 may be an access point 20 as described above in relation to FIG. 2.

Dynamic Beamforming Configuration Based on Network Conditions

In some embodiments, controller may utilize beamforming capabilities of access points to increase capacity of wireless channels. For example, in some cases intelligently aiming a data transmission at a receiving client device to avoid obstructions in a wireless channel path may result in an increased data throughput for the wireless channel. The increased capacity of these channels may improve a high density condition or prevent a high density condition from occurring. In some cases, (1) a particular access point may provide a greater capacity gain than other access points in a wireless network, or (2) beamforming may not provide any capacity gain in comparison to traditional communications.

Figure 3:
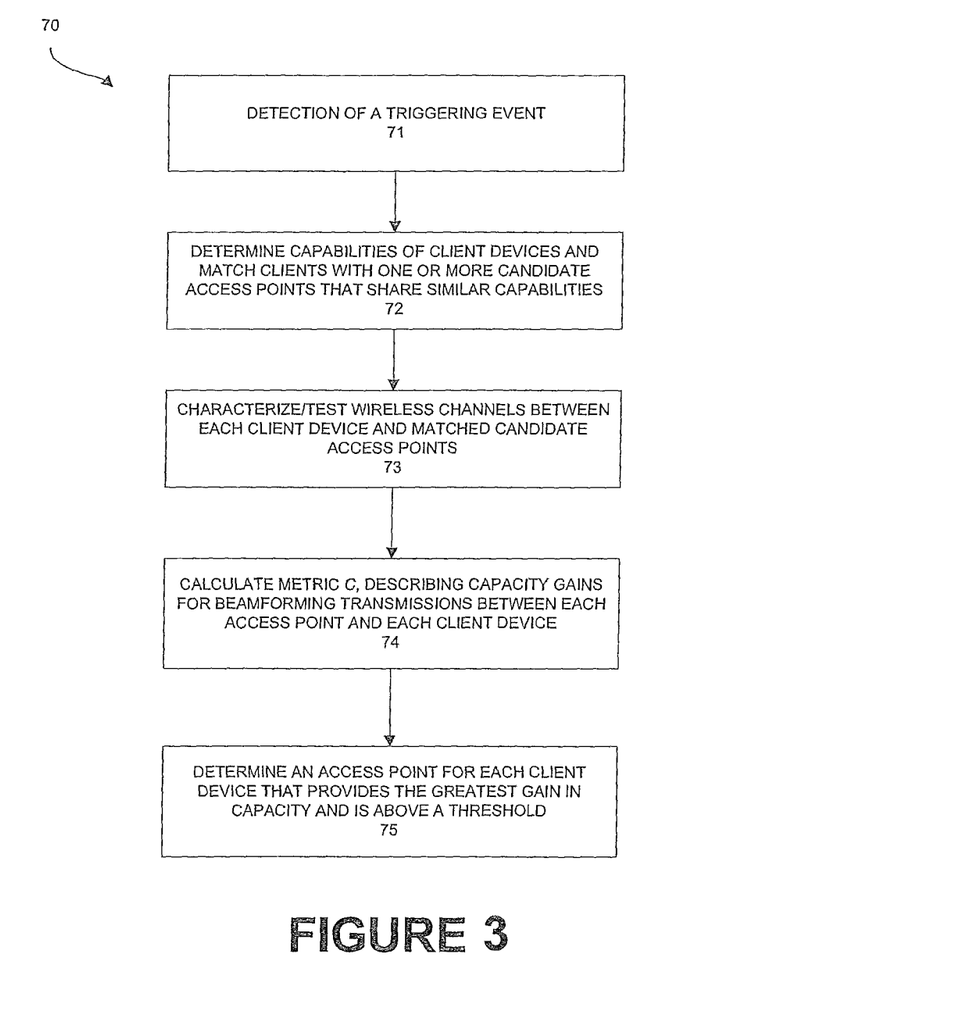
FIG. 3 shows a method for steering client devices to access points that may increase capacity of an associated wireless channel in accordance with one or more embodiments.

FIG. 3 shows a method 70 for steering client devices 30 to access points 20 that may increase capacity of an associated wireless channel 35. Method 70 may be performed by controller 10 and/or on one or more access points 20 in network 1. In one embodiment, method 70 is only performed for access points 20 and client devices 30 that support beamforming operations (e.g., IEEE 802.11 ac compliant components). In this embodiment, non-beamforming access points 20 and client devices 30 may be ignored in the method 70.

Method 70 may begin at operation 71 with the detection of a triggering event. The triggering event may be the detection of a high density condition on an access point 20. For example, a high density condition may be defined as the average airtime on a particular access point 20 being greater than a predefined threshold value (e.g., 80% airtime usage). In other embodiments other triggers may be used. For example, method 70 may commence upon the selection of a reset of network 1 or an access point 20 by a network administrator or a client device 30 joining network 1.

At operation 72, characteristics of client devices 30 associated with access points 20 are determined and client devices 30 are matched with candidate access points 20 that share similar capabilities. For example, operation 72 may determine that client device $30_1$ supports 20/40/80/160 MHz channel widths and beamforming transmissions. Based on these determined capabilities, operation 72 matches one or more candidate access points 20 for each client device 30 that share similar capabilities (i.e., support 20/40/80/160 MHz channel widths and beamforming transmissions). In one embodiment, client devices 30 that are capable of receiving beamformed signals may be matched with candidate access points 20 that are capable of beamforming transmissions. For example, access points 20 and client devices 30 that support IEEE 802.11ac may be matched together such that beamforming transmissions may be performed when capacity gains may be achieved as described further below. In one embodiment, matching of client devices 30 with one or more candidate access points 20 may be performed based on results from probe and association sequences. In addition to matching client devices 30 with access points 20 that support beamforming transmissions, operation 72 may match client devices 30 with access points 20 based on support for very high throughput (VHT) and/or high throughput (HT) communications. For example, client devices 30 that support VHT communications may be matched with one or more candidate access points 20 that also support VHT communications. Similarly, client devices 30 that support HT communications may be matched with candidate access points 20 that also support HT communications. This matching of client devices 30 and access points 20 that share similar capabilities will improve potential capacity gains by reducing the likelihood of data transfer bottlenecks.

At operation 73, wireless channels 35 between each client device 30 and corresponding candidate access points 20 are examined and characterized/tested. In one embodiment, operation 73 determines the impulse response H or channel state information (CSI) of the wireless channels 35 between each client device 30 and corresponding candidate access points 20. Characterization or testing of each wireless channel 35 may be performed using explicit or implicit feedback mechanisms.

In one embodiment, explicit feedback is used to characterize wireless channels 35 between access points 20 and their associated client devices 30 using a sounding mechanism. For example, each client device 30 may send explicit feedback in response to corresponding requests from each access point 20. The request from access points 20 may be Request-To-Send (RTS) and/or Network Discovery Protocol Announcement (NDPA) frames. In one embodiment, each access point 20 may send a RTS in a control wrapper frame (cwRTS) to each associated client device 30. The cwRTS may include an NDPA indicator and a set of training symbols to solicit information from associated client devices 30. In response to received cwRTS frames, each client device 30 transmits a Clear-To-Send (CTS) in a control wrapper frame (cwCTS) to corresponding access points 20. Access points 20 may calculate CSI estimates for wireless channels 35 based on responses from client devices 30. The CSI estimates describe how a signal propagates from access points 20 to client devices 30 over wireless channels 35 and represent the combined effect of, for example, scattering, fading, and power decay with distance over wireless channels 35. As will be described further below, these CSI estimates makes it possible to determine the potential capacity increases using beamforming transmissions between each access point 20 and associated client devices 30 in network 1.

In the explicit sounding mechanism described above, CSI estimates are obtained for wireless channels 35 between access points 20 and their associated client devices 30. An access point 20's associated client devices 30 are client devices 30 that for at least a momentary period of time are wirelessly connected with the respective access point 20. In one embodiment, controller 10 may cause each client device 30 to associate with candidate access points 20 that are viewable/in-range for a brief period of time (e.g., 1-2 seconds) such that operation 73 may establish CSI estimates for corresponding wireless channels 35 between each client device 30 and each corresponding in-range candidate access point 20.

Although described in relation to access points 20 and their associated client devices 30, in one embodiment controller 10 may determine CSI estimates for wireless channels 35 between candidate access points 20 and non-associated client devices 30 by spoofing CSI requests. For example, controller 10 may cause access point $20_1$ to spoof a CSI estimation request frame with the source address of access point $20_2$. Access point $20_1$ transmits the request to client device $30_4$ that is associated with access point $20_2$, but not with access point $20_1$. Upon receipt of the request, client device $30_4$ transmits the response to access point $20_2$, based on the spoofed source address in the request. The CSI estimate computed by access point $20_2$ represents the wireless channel 35 between access point $20_1$ and the non-associated client device $30_4$. Controller 10 may retrieve this CSI estimate for further processing. By spoofing the source address, this routine does not require each client device 30 to be associated with each access point 20 in network 10 such that CSI estimations may be determined for each possible wireless channel 35.

As noted above, CSI estimates may also be determined based on implicit feedback. Implicit feedback is obtained from information transmitted by client devices 30 upon association with access points 20. In particular, client devices 30 may transmit implicit long symbols generated on client devices 30 to access points 20. Access points 20 may thereafter generate CSI estimates based on these long symbols. Explicit feedback has the benefit of allowing access points 20 determine CSI estimates based on their transmission view to client devices 30, whereas implicit feedback is sourced from client devices 30 alone.

Upon computation of CSI estimates between client devices 30 and corresponding candidate access points 20 at operation 73, operation 74 tests each connection/wireless channel 35 to estimate potential capacity gains achieved through the association of each client device 30 with each corresponding candidate access point 20 using beamforming transmissions based on the previously computed CSI estimates. Beamforming transmissions apply weights to transmitted signals to improve reception at client devices 30. The weights are calculated based on CSI estimates and compensate for interferences in wireless channels 35. In one embodiment, testing each connection/wireless channel 35 to estimate potential capacity gains may be based on one or more of wireless signal strength for each connection/wireless channel 35 and the number of spatial streams for the connection/wireless channel 35.

The system model for beamforming transmissions from an access point 20 to a client device 30 over a corresponding wireless channel 35 with N spatial streams may be represented as:

$$Y = k \times H \times V \times X + Z \qquad \text{Equation 1}$$

In Equation 1, matrix X represents the data transmitted from an access point 20 to a client device 30; k represents the signal to noise ratio in the transmission; H represents the channel fading matrix (i.e., the impulse response/CSI for the wireless channel 35); Z represents additive noise in the wireless channel 35; V represents a transmit weighting matrix used to create the transmission beam from the access point 20 to the receiving client device 30; and matrix Y represents the received signal.

In one embodiment, the singular value decomposition of the channel fading matrix H is used to calculate the weights in transmit weighting matrix V. In this embodiment, the channel fading matrix H may be represented as:

$$H = U \times S \times V^* \qquad \text{Equation 2}$$

In Equation 2, V* is the complex conjugate transpose of transmit weighting matrix V; S is a diagonal matrix of singular values, which are the square roots of the eigenvalues of H×H*; and U is the unitary matrix. For the signal transmitted using Equation 1, where transmit weighting matrix V is calculated from the singular value decomposition of channel fading matrix H using Equation 2, the output signal-to-noise ratio for spatial stream S(r), may be represented as:

$$SNR(r) = SNR(avg) \times S(r)^* S(r) \qquad \text{Equation 3}$$

In Equation 3, S(r) is the r'th diagonal entry of spatial stream S. The overall signal-to-noise ratio for equal modulation and coding schemes (MCS) may be represented as:

$$SNR = \min(SNR(r)) \qquad \text{Equation 4}$$

Based on the above equations, operation 74 may use a metric C to evaluate the potential capacity benefit for using transmission beamforming between each client device 30 and corresponding candidate access points 20 in network 1 using the determined CSI information obtained at operation 73. The metric C over each of the N spatial streams may be represented as:

$$C = B \sum_{r=1}^{N} \log_2(1 + SNR(r)) - \log_2 1 + SNR(avg) \qquad \text{Equation 5}$$

In the above Equation 5, B represents the channel width for the corresponding wireless channel 35. As noted above, the metric C may be calculated for each client device 30 in network 1 in relation to each corresponding candidate access point 20. In some embodiments values for metric C are calculated only for client devices 30 and corresponding candidate access points 20 that are capable of beamforming signals (e.g., only 802.11ac access points 20 and client devices 30).

Upon the calculation of values for metric C at operation 74, operation 75 compares each of the C values for each client device 30 with a capacity threshold value and determines (1) whether beamforming transmissions provides a capacity benefit and (2) for each client device 30, which corresponding candidate access point 20 provides the greatest beamforming capacity gain. In one embodiment, beamforming transmissions provide capacity gains when corresponding metric C values fall below a capacity threshold value. In one embodiment, the capacity threshold is equal to the channel width of the corresponding wireless channel 35 (e.g., 20 MHz, 40 MHz, 80 MHz, or 160 MHz). For example, client device $30_1$ in FIG. 1 may have metric C values of {60 MHz, 50 MHz, 90 MHz, 160 MHz} corresponding to candidate access points $20_1$-$20_4$, respectively and the capacity threshold may be equal to 80 MHz. On the basis of these values, operation 75 may determine that client device $30_1$ obtains capacity gains above the capacity threshold (i.e., C>80 MHz) when associated with access points $20_3$ and $20_4$ with transmission beamforming activated. Since the capacity gain would be higher when associated with access point $20_4$, operation 75 determines that client device $30_1$ should be associated with access point $20_4$. Operation 75 may be performed for each client device 30 such that each client device 30 is associated with an access point 30 that potentially delivers a higher throughput capacity. In some embodiments, operation 75 may determine that no change in association for a client device 30 may be needed as metric C values for the client device 30 do not exceed the capacity threshold value (e.g., C<80 MHz for each access point 20). Based on the determination regarding beamforming transmission, operation 75 associates a client device 30 with an appropriate access point 20 that delivers the highest capacity gain with beamforming or maintains the client device 30 with the current access point 20 without beamforming activated. Moreover, a bin packing based approach could also be adopted to solve the problem of associating a respective client device with an appropriate access point, because the number of client devices to which an access point can beamform is usually limited.

In one embodiment, operation 75 may determine an optimized association of client devices 30 that maximizes capacity of the entire network 1. For example, operation 75 may associate each of D client devices 30 with access points 20 such that the sum of all C values is maximized over the network 1.

$$\text{maximize} \sum_{i=1}^{D} C(i) \qquad \text{Equation 6}$$

In one embodiment, maximization of the capacity of network 1 may be viewed as a bin packing problem, where different associations of client devices 30 with access points 20 using beamforming transmissions are proposed and corresponding C values for the network are computed. In this embodiment, the permutation with the highest capacity C for network 1 may be selected. By maximizing the capacity of network 1, operation 75 ensures that associations of client devices 30 with access points 20 that provide individual capacity gains do not ultimately negatively alter the capacity of the entire network.

By associating client devices 30 with access points 20 that provide potential beamforming capacity gains, method 70 improves transmission capacity of network 1 in an intelligent manner. Note that, method 70 may be combined with channel width configuration methods disclosed in co-pending patent application entitled "Channel Width Configuration Based on Network Condition" to improve performance and efficiency of network 1 by (1) adjusting channel widths between access points 20 and client devices 30 and (2) steering client devices 30 to access points 20 that may increase capacity of an associated wireless channel 35.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method of determining access points for client devices, the method comprising:
determining at least one candidate access point from a set of access points for each client device having matching characteristics including the at least one candidate access point having an ability to transmit and receive beamforming transmissions and the at least one candidate access point supporting same channel widths as the client device;
determining channel state information for a wireless channel between each client device and an associated at least one candidate access point;
testing each wireless channel to estimate potential capacity gain between the client device and its associated at least one candidate access point using the channel state information and beamforming transmissions;
wherein the testing includes evaluating one or more configurations for each of the associated candidate access points, and the evaluating includes calculating capacities between the at least one candidate access point and its associated client device;
based on a comparison of the estimated potential capacity gain to a capacity threshold value, determining which associated candidate access point provides a greatest beamforming capacity gain for each client device;
for each client device, selecting an access point from the at least one candidate access point associated with the client device and a configuration of the one or more configurations based on the testing and the comparison; and
instructing the selected access point and its associated client device to enable beamforming transmissions according to the selected configuration.

2. The method of claim 1, wherein the testing comprises:
instructing each candidate access point associated with the client device to obtain channel state information for one or more client devices not presently associated with the candidate access point, wherein the one or more client devices have similar characteristics as the candidate access point; and
determining a change in the estimated potential capacity, wherein the determining the change includes using beamforming transmissions between the candidate access point and the one or more client devices not presently associated with the candidate access point.

3. The method of claim 2, further comprising:
determining that the change in potential capacity is an increase; and
instructing the candidate access point to associate with the one or more client devices not presently associated with the access point.

4. The method of claim 1, comprising instructing the candidate access point to perform a sounding protocol to determine its channel state information.

5. The method of claim 1, comprising obtaining information transmitted by the client device to its associated at least one candidate access point, wherein the information is transmitted when the client device associates with the at least one candidate access point.

6. The method of claim 1, wherein determining the potential capacity includes determining one or more spatial streams that can be transmitted between each client device and its associated at least one candidate access point.

7. The method of claim 1, further comprising:
detecting a triggering event, wherein the triggering event initiates the determination of the matching characteristics.

8. The method of claim 7, wherein the triggering event includes detecting a high density condition on an access point.

9. The method of claim 7, wherein the triggering event includes detecting a reset event.

10. The method of claim 7, wherein the triggering event includes detecting that a new client device has associated with a candidate access point.

11. A network device comprising:
a non-transitory computer-readable medium containing instructions that, when executed by one or more processors, cause the one or more processors to perform operations including:
for each of a plurality of client devices, determining at least one candidate access point from a set of access points for the client device having matching characteristics including the at least one candidate access point having an ability to transmit and receive beamforming transmissions and the at least one candidate access point supporting same channel widths as the client device;

determining channel state information for the wireless channel between each client device and an associated at least one candidate access point;

testing each wireless channel to estimate potential capacity gain between the client device and its associated at least one candidate access point using the channel state information and beamforming transmissions;

wherein the testing includes evaluating one or more configurations for each associated at least one candidate access point, and the evaluating includes calculating capacities between each associated at least one candidate access point and its client device;

based on a comparison of the estimated potential capacity gain to a capacity threshold value, determining which associated candidate access point provides a greatest beamforming capacity gain for each of the client devices;

for each client device, selecting an access point from the at least one candidate access point associated with the client device and a configuration of the one or more configurations based on the testing and the comparison; and instructing the selected access point and its associated client device to enable beamforming transmissions according to the selected configuration.

12. The network device of claim 11, wherein the testing comprises:

instructing each candidate access point associated with the client device to obtain channel state information for one or more client devices not presently associated with the candidate access point, wherein the one or more client devices have similar characteristics as the candidate access point; and determining a change in the estimated potential capacity, wherein the determining includes using beamforming transmissions between the candidate access point and the one or more client devices not presently associated with the candidate access point.

13. The network device of claim 12, wherein the performed operations include:

determining that the change in potential capacity is an increase; and instructing the candidate access point to associate with the one or more client devices not presently associated with the access point.

14. The network device of claim 11, wherein the performed operations include instructing the candidate access point to perform a sounding protocol to determine its channel state information.

15. The network device of claim 11, wherein the performed operations include obtaining information transmitted by the client device to its associated at least one candidate access point, wherein the information is transmitted when the client device associates with the at least one candidate access point.

16. The network device of claim 11, wherein the performed operations include determining one or more spatial streams that can be transmitted between each client device and its associated at least one candidate access point.

17. The network device of claim 11, wherein the performed operations include:

detecting a triggering event, wherein the triggering event initiates the determination of the matching characteristics.

18. The network device of claim 17, wherein the triggering event includes causing the one or more processors to detect a high density condition on an access point.

19. The network device of claim 17, wherein the triggering event includes causing the one or more processors to detect a reset event.

20. The network device of claim 17, wherein the triggering event includes causing the one or more processors to detect that a new client device has associated with the candidate access point.

21. A network device connected to access points and client devices, the network device comprising:

at least one processor to:

determine, for each client device, candidate access points from the access points based on matching characteristics including the candidate access points having an ability to transmit and receive beamforming transmissions and the candidate access points supporting same channel widths as the client device;

determine channel state information for each wireless channel between each client device and its associated candidate access points;

test each of the wireless channels using the channel state information determined for the wireless channel and beamforming transmissions, wherein the testing includes evaluating one or more configurations for each of the associated candidate access points, and the evaluating of the one or more configurations includes calculating estimated potential capacity gains between each of the candidate access points and its associated client device;

compare each of the estimated potential capacity gains to a capacity threshold value;

based on the comparisons, determine which corresponding candidate access points provide greatest beamforming capacity gains for each of the client devices;

for each client device, select an access point from its associated candidate access points and a configuration of the one or more configurations based on the testing and the comparisons; and instruct the selected access point and its associated client device to enable beamforming transmissions according to the selected configuration.

* * * * *